United States Patent
Lamm et al.

(10) Patent No.: US 6,369,378 B1
(45) Date of Patent: Apr. 9, 2002

(54) DEVICE FOR DETECTING SURFACE WETNESS

(75) Inventors: Hubert Lamm, Kappelrodeck; Hans Meier, Otterweier; Wolfgang Hermann, Freising; Henry Blitzke; Guenter Haderer, both of Buehl, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/445,045
(22) PCT Filed: May 19, 1998
(86) PCT No.: PCT/DE98/01374
§ 371 Date: Dec. 1, 1999
§ 102(e) Date: Dec. 1, 1999
(87) PCT Pub. No.: WO98/55347
PCT Pub. Date: Dec. 10, 1998

(30) Foreign Application Priority Data

Jun. 6, 1997 (DE) ............................. 197 23 859

(51) Int. Cl.⁷ .................................... G02B 6/42
(52) U.S. Cl. .................. 250/227.25; 250/573; 318/483; 340/602
(58) Field of Search ............... 250/227.25, 573–577, 250/559.4, 214 AL, 214 B; 356/436, 440, 448; 318/483; 340/602

(56) References Cited

U.S. PATENT DOCUMENTS

| | | | |
|---|---|---|---|
| 5,059,877 A | * 10/1991 | Teder | 318/444 |
| 5,703,568 A | * 12/1997 | Hegyi | 340/602 |
| 5,847,654 A | * 12/1998 | Hog | 340/604 |

* cited by examiner

Primary Examiner—Que T. Le
Assistant Examiner—Thanh X Luu
(74) Attorney, Agent, or Firm—Michael J. Striker

(57) ABSTRACT

The device for the detection of a wetting of a pane of glass, has an optical rain sensor which detects extraneous light and evaluates it for purposes of day-night detection. The amount of light striking the receiver (14) is integrated in an integration stage (16) and supplied to a comparator stage (20). The total light quantity formed by the light of a transmitter (12) and extraneous light and the extraneous light quantity detected when the transmitter (12) is switched off are measured in separate time intervals (Tg, Tf, Tf'). The time interval (Tf, Tf') utilized for measurement of the extraneous light quantity is to be extended after a predeterminable number of measurement cycles (M) or after a predeterminable time period and/or the threshold (S2) is to be lowered for day-night detection.

10 Claims, 2 Drawing Sheets

DEVICE FOR DETECTING SURFACE WETNESS

BACKGROUND OF THE INVENTION

1. Field of the Invention

The present invention relates to a device for detection of wetting of a pane of glass, or windshield, and, more particularly, to a device for detecting wetting of a pane of glass, or windshield, including a rain sensor with a measurement circuit comprising a light-radiating transmitter and a receiver for the light from the light-radiating transmitter and an evaluating device connected with the receiver to evaluate light impinging on the receiver.

2. Prior Art

A device having an optical rain sensor and an evaluating unit is described in a previous German patent application (number 196 21 627). The rain sensor detects the wetting of a pane of glass or windshield by means of a light-radiating transmitter and a light receiver which responds to the radiated light and delivers a sensor signal to the evaluating unit. The windshield, as a measurement path of the rain sensor, is located in the optical beam path.

A measurement circuit in the rain sensor has a capacitor as an integration stage for detecting the amount of light striking the receiver and a comparator stage which delivers a trigger signal to the evaluating unit when the quantity of light integrated after a certain point in time exceeds a given threshold within a time interval. For this purpose, the total amount of light formed by the light of the transmitter and possibly by extraneous light and the amount of extraneous light detected when the transmitter is switched off are measured in separate time intervals. The evaluating unit has a timer which generates a count corresponding to the integration period preceding the trigger signal of the comparator stage.

During a first time interval for total light measurement, the transmitter of the rain sensor is switched on and radiates light onto the receiver over the pane of glass used as measurement path. In so doing, extraneous light from the surroundings also reaches the receiver. A value for the total amount of light is derived from the integration period. In the second time interval for extraneous light measurement, the transmitter of the rain sensor is switched off, so that only extraneous light can reach the receiver. A value for the quantity of extraneous light is derived from this second integration period.

A useful light quantity corresponding to the wetting of the pane of glass is determined from the difference between the total light quantity and the extraneous light quantity. An automatic motor vehicle windshield wiping system, for example, is controlled depending on the useful light quantity.

A disadvantage consists in that a new extraneous light measurement is carried out only when there is a change in the total amount of light and, for this reason, a change in the amount of extraneous light is not detected when the total amount of light remains constant.

A further disadvantage consists in that frequent changes in the total light quantity, e.g., when driving along a shadowy street or through a tunnel, the extraneous light measurement is likewise carried out more frequently and the irregular switch-on and switch-off times of a transmitter diode which are brought about for this reason cause an unwanted irregular fluctuation of the radiation output of the transmitter.

In this connection, it is especially disadvantageous that the extraneous light quantity is evaluated only in connection with the total light quantity and a separate extraneous light evaluation is not carried out. Day-night detection is not carried out in this case.

In addition, there are commercially known rain sensors which, in addition to the transmitter and the receiver for detecting the wetting of the windshield, also have a photocell for day-night detection for controlling the trigger sensitivity of the rain sensor. It is disadvantageous that the photocell, as an additional component of the rain sensor, adds to the expense of producing the sensor.

SUMMARY OF THE INVENTION

According to the invention the device for detecting wetting of a pane of glass, especially a windshield of a motor vehicle, includes a measurement circuit comprising a light-radiating transmitter for generating radiated light, a light receiver arranged to receive a portion of the radiated light according to the wetting of the pane of glass or windshield as well as extraneous light and to generate a sensor signal depending on a light amount of that portion of the radiated light and the extraneous light reaching the receiver, an integration stage for integrating the sensor signal from the light receiver and thus to obtain an integrated sensor signal and a comparator for generating a trigger signal when the integrated sensor signal exceeds a predetermined threshold; and an evaluating circuit including a device for turning on the light-radiating transmitter during first predetermined time intervals and for turning off the light-radiating transmitter during second predetermined time intervals for evaluating the extraneous light and for day-night detection; a device for determining an integrated light quantity reaching the light receiver during each time interval when a respective trigger signal is received; a device for adjusting the predetermined threshold of the comparator to a first threshold value during each first predetermined time interval during which the light-radiating transmitter is turned on and to a second threshold value during each second predetermined time interval during which the light-radiating transmitter is turned off for evaluating the extraneous light and for day-night detection and a device for adjusting each second predetermined time interval to a first time interval value for evaluating the extraneous light and to a second time interval value for day-night detection after a predetermined number of extraneous light measurements, the second time interval value being longer than the first time interval value.

The device according to the invention has the advantage that the extraneous light is detected and evaluated for purposes of day-night detection. For this purpose, after a given quantity of extraneous light measurements within a short interval of time, an extraneous light measurement is carried out over a longer time interval or with a lower threshold for accurate detection of small amounts of extraneous light.

It is particularly advantageous that the rain sensor has only one receiver which detects the transmitter light for the wetting of the pane of glass and detects the extraneous light for day-night detection.

It is particularly advantageous that the device can be used for controlling a windshield wiper system and other devices. For example, depending on the wetting of the windshield and/or day-night detection, windshield wipers are controlled, headlights are switched on or off or a sliding roof is actuated.

It is further advantageous that the sensitivity or the switching threshold of the rain sensor or the amplification of the sensor signal can be adjusted depending on the amount of extraneous light.

BRIEF DESCRIPTION OF THE DRAWING

Embodiment examples of the invention are shown in the drawing and described more fully in the following description.

DESCRIPTION OF THE PREFERRED EMBODIMENTS

Figure 1:
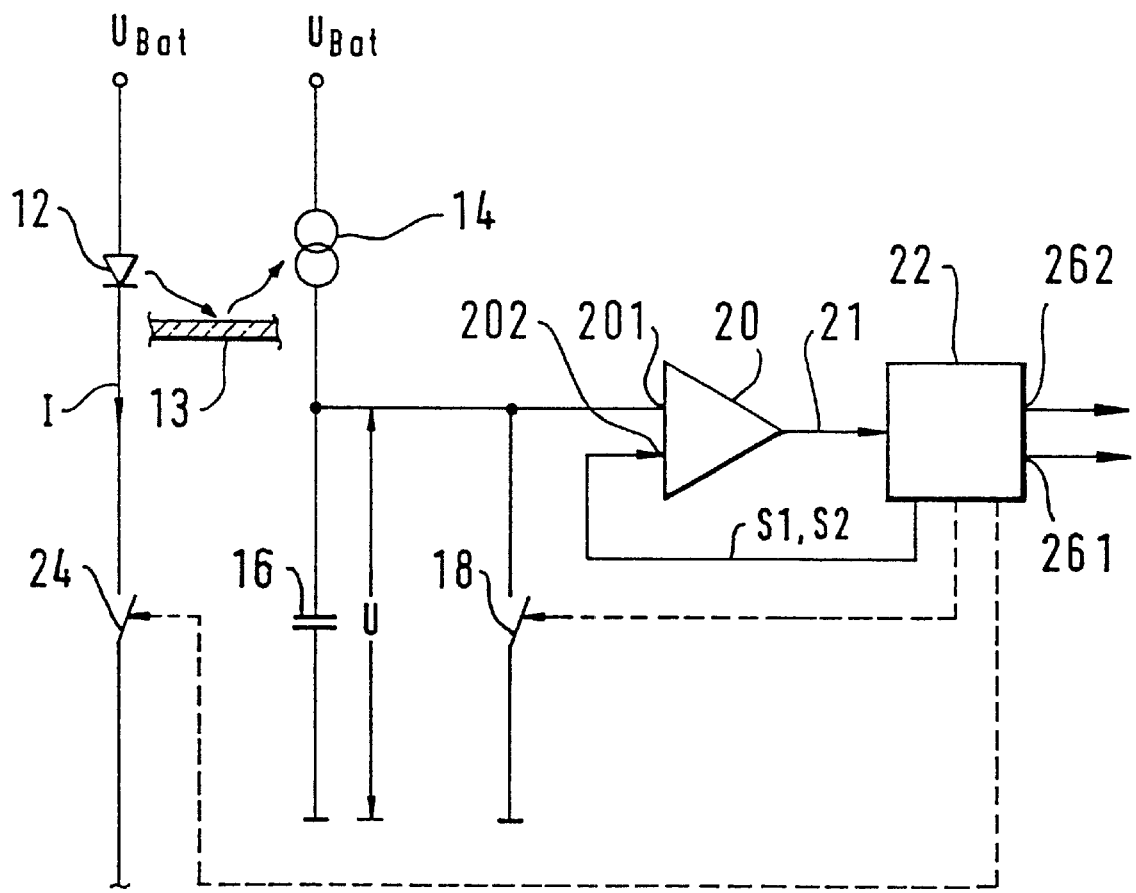
FIG. 1 shows a block diagram of the rain sensor device.

FIG. 1 shows a block diagram of the rain sensor device. A diode, light-radiating as transmitter 12, is supplied by battery voltage $U_{Bat}$ in a transmitter circuit. A switch 24 in the transmitter circuit switches a transmitter current 1. Radiated light of the transmitter 12 is directed over an optical measurement path 13, e.g., a motor vehicle windshield, to a light receiver 14. The receiver 14, which is also powered by battery voltage $U_{Bat}$, is realized as a constant-current source which, depending on the detected quantity of light, generates a charge current for a capacitor 16 and, in this connection, a capacitor voltage U which is proportional to the integral of the light quantity. The capacitor 16 accordingly forms an integration stage.

Another switch 18 is connected in parallel with the capacitor 16 and short-circuits the capacitor 16 in the closed state. Both switches 18, 24 are controlled by an evaluating circuit 22, for example, a microcontroller.

The capacitor voltage U is applied to an input 201 of a subsequent comparator 20 whose output is connected with an input of the evaluating circuit 22. This evaluating circuit 22 applies first and second thresholds S1, S2 to a second input 202 of the comparator 20.

The evaluating circuit 22 has outputs 261, 262 for the control units, not shown, of subsequent devices, e.g., windshield wipers and sliding roof.

FIG. 2a shows the normalized transmitter current I switched by the switch 24 plotted over time t.

The transmitter 12 is switched on over a constant time interval t1 to t3 for total light measurement Tg and is switched off over a subsequent constant time interval t3 to t5 for extraneous light measurement Tf. During total light measurement Tg, transmitter light and possible extraneous light which can reach the receiver 14 through the optical measurement path 13 is detected. A total light measurement Tg and an extraneous light measurement Tf give a measurement cycle M, for example, 9 milliseconds.

After a given number of successive measurement cycles M, an extraneous light measurement with an extended time interval Tf', e.g., one second, is carried out for a night measurement cycle N, as it will be called. The night measurement cycle N is suitable for detecting very small amounts of extraneous light such as occur during twilight or at night.

FIG. 2b shows the signal shape of the capacitor voltage U plotted over the same time axis t. The capacitor 16 integrates the detected total light quantity or extraneous light quantity over time intervals Tg, Tf, Tf' and is reset to zero at the end of every time interval. Further, two thresholds S1, S2 are indicated by short strokes in FIG. 2b; the first threshold S1 is used for total light measurement and the second threshold S2 is used for extraneous light measurement.

The period between the resetting of the capacitor voltage U to zero and the time that the voltage U reaches the first or second threshold S1, S2 is designated as an integration period for total light measurement tg or for extraneous light measurement tf.

FIG. 2c illustrates the thresholds S1, S2 which are alternately applied by the evaluating circuit 22 at the second input 202 of the comparator 20.

Figure 2:
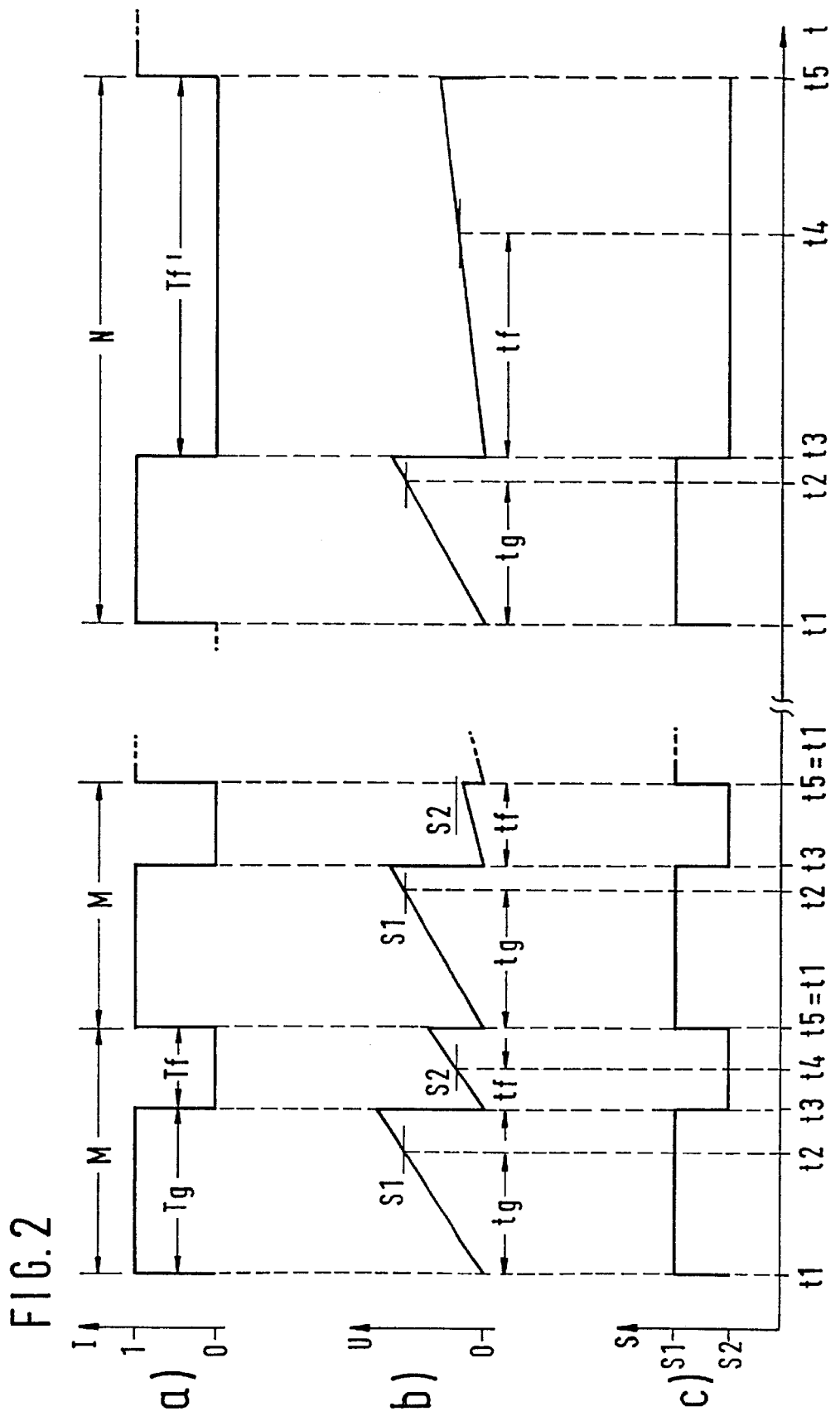
FIG. 2a shows the signal shape of a light-radiating transmitter current.
FIG. 2b shows the signal shape of an integrated light quantity.
FIG. 2c shows the respective applied thresholds plotted over time.

The functioning of the device according to FIG. 1 will be described more fully with reference to FIG. 2.

The time span from t1 to t5 characterizes a measurement cycle M or night measurement cycle N. The voltage shape of the first measurement cycle M represents, for example, the detected total light quantity and extraneous light quantity in daylight, during which the extraneous light component can be very large. The second measurement cycle M and the night measurement cycle N represent a voltage shape typical for the nighttime with a small extraneous light component.

The time interval of total light measurement Tg (for example, six milliseconds) in which the transmitter light and extraneous light are simultaneously detected by the receiver 14 starts at time t1 of every measurement cycle M, N. For this purpose, the switch 24 in the transmitter circuit is closed by the evaluating circuit 22, so that transmitter current I flows and the transmitter 12 radiates light in the measurement path onto the receiver 14. The receiver 14 generates a charge current proportional to the detected total amount of light for charging the capacitor 16. The first switch 18 is open, so that voltage U is built up across the capacitor 16. The voltage U is fed to the comparator 20. The first threshold S1 is applied to the second input 202 of the comparator 20.

A timer present in the evaluating circuit 22 is activated by the latter and increments its counter state every two microseconds.

At time t2, the capacitor voltage U reaches the first threshold S1 and the comparator 20 delivers a trigger signal 21 to the evaluating circuit 22. The timer is then switched off. The counter state of the timer corresponds to the integration time of the total light quantity tg=t2−t1. During the above-mentioned disengagement of the timer and for the duration of measurement, the counter state has a value between zero and 3000 increments; a large total light quantity corresponds to a short integration time tg and a low counter state.

The reciprocal of the determined integration time tg is taken by a reciprocal value element in the evaluating circuit 22 and, in order to avoid decimal points, this reciprocal value is multiplied by a factor and stored temporarily. With a 16-bit timer, this factor is advantageously 65535, i.e., in hexadecimal representation, FFFF. Alternatively, the determined integration time tg is first stored temporarily and then evaluated subsequently.

The time interval of six milliseconds provided in the evaluating circuit 22 for total light measurement Tg ends at time t3. The switch 24 for the transmitter circuit is opened, so that the transmitter current I is zero and the transmitter 12 is switched off. At the same time, the switch 18 is closed in order to short-circuit the capacitor 16 and is then opened again to make the capacitor 16, as integration stage, ready for the subsequent time interval Tf. The opening and closing of the switch 18 is not temporally resolved in FIG. 2.

The second threshold S2 is applied to the input 202 of the comparator 20. This second threshold S2 is one eighth of the first threshold S1, for example.

The time interval for extraneous light measurement Tf, for example, three milliseconds, starts and a capacitor voltage U proportional to the extraneous light quantity is built up across the capacitor 16. The timer is activated again.

At time t4, the voltage U has reached the second threshold S2 applied to the comparator 20. The comparator 20 sends a trigger signal 21 to the evaluating circuit 22, so that the counter state of the timer, which now corresponds to the integration time for the extraneous light measurement tf, is stopped and detected. During the interval Tf of three milliseconds and the above-mentioned cancellation, the counter state can be between 0 and 1500 increments.

During the second measurement cycle M, the second threshold S2 is not reached, as is shown in FIG. 2b. This occurs when the extraneous light component is very small. The maximum integration value tf, in this case, 1500 increments, is then detected by the evaluating circuit 22.

In order to be able to determine an integration period tf also with small amounts of extraneous light, a night measurement cycle N with an extended time interval for extraneous light measurement Tf' (e.g., Tf'=1 second) is carried out after a given quantity of measurement cycles M, for example, five, or after a given time which can range from one second to one minute. In this extended time interval Tf', the capacitor voltage U proportional to the amount of extraneous light reaches the second threshold S2 even in deep darkness, so that an integration period tf is determined by the timer. The time interval Tf' is not shown true to scale in FIG. 2.

The integration period for extraneous light measurement tf is evaluated and stored temporarily like the above-described integration period for total light measurement tg.

The time interval for extraneous light measurement Tf, Tf' ends at time t5 and the capacitor 16 is short-circuited via the switch 18. When the voltage U across the capacitor 16 is reset to zero, the switch 18 is opened again. Time t5 of the current measurement cycle M, N corresponds to time t1 of the following measurement cycle M, N. The time interval for total light measurement Tg now follows the time interval for extraneous light measurement Tf, Tf'.

For further evaluation of the integration periods tg, tf relating to the different thresholds S1, S2 and of the values determined from these integration periods, these values are converted in parallel with the measurements and independent therefrom in such a way that they are compared with one another. A useful light quantity is calculated from the values determined in the same measurement cycle M, N from the difference between the total light quantity and the extraneous light quantity and a useful light signal is generated. This useful light signal is supplied to a control unit for devices downstream via the first output 261 of the evaluating circuit 22. In an optical rain sensor, the useful light signal correlates with the wetting of the windshield, e.g., by precipitation, fog or dirt.

When the rain sensor detects the wetting of a motor vehicle window, e.g., the front windshield, the useful light signal is usually used for the automatic control of a motor vehicle windshield wiper as a device downstream as soon as the useful light signal, e.g., falls below a threshold value given by the device.

Alternatively or in addition, the useful light signal is used for controlling a sliding roof in a motor vehicle in that the sliding roof is adjusted or closed when rain is detected by the rain sensor.

Further, the useful light signal is evaluated for controlling headlights and fog lights, so that they are switched on and then switched off again starting from a given intensity of precipitation or density of fog.

In addition, the amount of extraneous light is evaluated independently from the total light quantity in that the extraneous light signal derived therefrom is supplied, via the second output 262, to the control unit or to another control unit which controls devices downstream depending on the amount of extraneous light and on day-night detection connected therewith.

For example, when driving at night or when driving through a tunnel, darkness is detected by the device according to the invention and the headlights, dashboard illumination or the like is switched on. Switching between fade-in and fade-out is also carried out by means of the control unit.

With respect to a headlight wiping-cleaning system which is normally activated at the same time as a windshield wiping-washing system, manual or automatic switching on of the wiping-cleaning system under daylight conditions only results in a triggering of the windshield wiping-cleaning system, since the cleaning of the headlights which are switched off during daylight is not necessary.

A ventilation control of the motor vehicle can be realized through automatic closing of the sliding roof when darkness is detected in connection with an additional temperature sensor.

The detection of moisture on the windshield is also evaluated in connection with day-night detection. For example, the extraneous light quantity is utilized for adjusting the sensitivity or a switching threshold of the rain sensor or amplification of the sensor signal. Accordingly, the maximum sensitivity and minimum switching threshold can be adjusted in the evaluating circuit 22 during darkness, while minimum sensitivity and maximum switching threshold can be adjusted in the evaluating circuit 22 during light. This ensures an optimum response, e.g., of the automatic windshield wiper system.

In alternative embodiment examples, the time interval for extraneous light measurement Tf is maintained for extraneous light measurement in the night measurement cycle N, but the second threshold S2 supplied to the comparator 20 is lowered, so that small amounts of extraneous light can be detected. Optimum threshold value ratios of the second threshold S2, e.g., 2, 8 or 16, can be realized by means of different resistance circuits in the evaluating circuit 22.

Further, a lowering of the threshold S2 can be realized together with an extension of the time interval tf'.

What is claimed is:

1. A device for detecting wetting of a pane of glass, or a windshield, said device comprising a rain sensor including
a measurement circuit comprising a light-radiating transmitter (12) for generating radiated light, a light receiver (14) arranged to receive a portion of the radiated light according to the wetting of the pane of glass or windshield as well as extraneous light and to generate a sensor signal depending on a light amount of the portion of the radiated light and the extraneous light reaching the receiver, an integration stage (16) for integrating the sensor signal from the light receiver and for generating an integrated sensor signal and a comparator (20) for generating a trigger signal (21) when the integrated sensor signal exceeds a predetermined threshold; and
an evaluating circuit (22) including means for turning on said light-radiating transmitter (12) during a plurality of first predetermined time intervals (Tg) and for turning off said light-radiating transmitter (12) during another plurality of second predetermined time intervals (Tf;Tf') for evaluating the extraneous light and for day-night detection; means for determining an integrated light quantity reaching said light receiver (14) during each of said time intervals when a respective one of said trigger signals is received; means for adjusting said predetermined threshold of said comparator to a first threshold value (S1) during each of said first predetermined time intervals during which the light-radiating transmitter is turned on and to a respective second threshold value (S2) during each of said second predetermined time intervals during which the light-radiating transmitter is turned off for evaluating the extraneous light and for day-night detection and means for adjusting each of said second predetermined time intervals to a first time interval value (Tf) for evaluating the extraneous light and to a second time interval value (Tf') for day-night detection after a predetermined number of extraneous light measurements, said second time interval value (Tf') being longer than said first time interval value (Tf).

2. The device as defined in claim 1, wherein said evaluating circuit (22) includes means for adjusting respective durations of each of said first predetermined time intervals and said second predetermined time intervals.

3. The device as defined in claim 2, wherein said predetermined time intervals are between one second and one minute.

4. The device as defined in claim 2, wherein said second predetermined time interval is between 10 milliseconds and ten seconds.

5. The device as defined in claim 1, wherein said predetermined threshold of said comparator (20) is continuously adjustable or is adjustable in discrete amounts.

6. The device as defined in claim 1, wherein said second threshold value is less than said first threshold value.

7. The device as defined in claim 6, wherein said second threshold value is a factor of 8 less than first threshold value.

8. The device as defined in claim 1, wherein said evaluating circuit (22) includes means for controlling at least one of a windshield wiper for said windshield, headlights, headlight wiping-cleaning systems, dashboard illumination, sliding roof and side windows of a motor vehicle in response to said integrated light quantity determined by said evaluating circuit.

9. The device as defined in claim 8, further comprising means for amplifying the sensor signal.

10. The device as defined in claim 8, wherein said evaluating circuit (22) has means for controlling a sensitivity or a switching threshold of the rain sensor depending on the extraneous light quantity.

* * * * *